(12) United States Patent
Fletcher et al.

(10) Patent No.: US 8,180,783 B1
(45) Date of Patent: May 15, 2012

(54) DOCUMENT RANKING SYSTEMS AND METHODS

(75) Inventors: David C. Fletcher, Overland Park, KS (US); Doug R. Wagers, Gardner, KS (US)

(73) Assignee: Softek Solutions, Inc., Prairie Village, KS (US)

( * ) Notice: Subject to any disclaimer, the term of this patent is extended or adjusted under 35 U.S.C. 154(b) by 190 days.

(21) Appl. No.: 12/775,993

(22) Filed: May 7, 2010

Related U.S. Application Data

(60) Provisional application No. 61/177,793, filed on May 13, 2009.

(51) Int. Cl.
G06F 7/00 (2006.01)
G06F 17/30 (2006.01)

(52) U.S. Cl. ......... 707/755; 707/769; 707/723; 715/230

(58) Field of Classification Search ........................ None
See application file for complete search history.

(56) References Cited

U.S. PATENT DOCUMENTS

| | | | | |
|---|---|---|---|---|
| 5,832,480 A | * | 11/1998 | Byrd et al. | 1/1 |
| 6,070,158 A | * | 5/2000 | Kirsch et al. | 1/1 |
| 6,684,202 B1 | * | 1/2004 | Humphrey et al. | 706/45 |
| 7,529,756 B1 | * | 5/2009 | Haschart et al. | 1/1 |
| 7,778,954 B2 | * | 8/2010 | Rhoads et al. | 715/713 |
| 7,814,155 B2 | * | 10/2010 | Buchheit et al. | 709/206 |
| 2006/0248440 A1 | * | 11/2006 | Rhoads et al. | 715/500 |
| 2007/0179945 A1 | * | 8/2007 | Marston et al. | 707/5 |
| 2007/0266019 A1 | * | 11/2007 | Lavi | 707/5 |
| 2009/0226872 A1 | * | 9/2009 | Gunther | 434/350 |
| 2011/0066616 A1 | * | 3/2011 | Rhoads et al. | 707/737 |

* cited by examiner

*Primary Examiner* — Shew-Fen Lin
(74) *Attorney, Agent, or Firm* — Polsinelli Shughart PC

(57) ABSTRACT

Systems and methods are provided for ranking document data retrieved from a data source in response to a search request. A ranking system retrieves document data from documents in the data source that each includes at least one key term that matches a search term in the search request. For each document, a term frequency value is calculated based on a number of occurrences of the key term in the document. Prefix and suffix term rules are used to determine whether a particular occurrence of the key term in a particular document should be included in determining a term weight value for that particular occurrence of the key term. A relevancy ranking value is determined for each document based on the corresponding term frequency and term weight values. The document data is displayed according to each document's corresponding relevancy ranking value.

34 Claims, 4 Drawing Sheets

DOCUMENT RANKING SYSTEMS AND METHODS

RELATED APPLICATIONS

This application takes priority to U.S. Patent Application No. 61/177,793, filed May 13, 2009, and entitled Document Ranking Systems and Methods, the entire contents of which are incorporated herein by reference.

FEDERALLY SPONSORED RESEARCH OR DEVELOPMENT

Not Applicable.

COMPACT DISK APPENDIX

Not Applicable.

BACKGROUND

Computer technology has made it possible for business enterprises to store and retrieve enormous quantities of information. For example, healthcare enterprises are increasingly dependent on computer information systems to store and retrieve medical information for patients. Such patient medical information may include text information and image data.

Due to the volume of information and the need to maintain security, patient medical records are often stored in a separate data storage system, such as a server or other computer system. The healthcare enterprise may use computers to communicate with the data storage system to retrieve desired records or documents. For example, the computer may employ a search engine application to find the desired information on the data storage system or a network. Typically, a user who has an idea of the type of information desired enters one or more search terms into a search engine. The search engine then returns a list of documents that the search engine has determined includes the user-specified search terms. If the search engine is searching a network, it may return a list of network locations (e.g., uniform resource locators (URLs)) that the search engine has determined includes an electronic document or web page relating to the user-specified search terms. The search engines typically list the documents and/or network locations based on some type of a relevancy ranking.

The relevancy ranking is an estimate of the likelihood that a given electronic document or a given electronic document at given network location is related to the user-specified search terms in comparison to other electronic documents. However, relevancy ranking algorithms often include rankings for documents with false negatives and/or false positives. A false negative occurs when a relevant document is not identified as relevant. A false positive occurs when an irrelevant document is listed as relevant. Moreover, ranking algorithms are often complex and require using grammar rules and/or syntax parsing to rank documents, which can require significant processing time.

SUMMARY

According to one aspect, a document ranking application includes modules that are executable by a processor to rank document data retrieved from a data source in response to a search request. The document ranking application includes a term frequency module to query the data source to identify one or more documents that each includes a key term. The key term matches a search term in the search request. The term frequency module also calculates a corresponding term frequency value for the key term in each of the one or more documents based on a number of occurrences of the key term in each document. A negation module retrieves negation terms from a memory and compares the negation terms to other terms included in each document that are within a selected proximity of each occurrence of the key term. The negation module also excludes a particular occurrence of the key term in each document if at least one of the negation terms matches the other terms within the selected proximity of the particular occurrence of the key term. The negation module also calculates a corresponding term weight value for the key term in each document based on each occurrence of the key term that has not been excluded. A ranking module determines a corresponding relevancy ranking value for each document based on the corresponding term frequency value and corresponding term weight value. A user interface module generates a list of document data for display. The list identifies the one or more documents in order based on the corresponding relevancy ranking value of each document.

According to another aspect, a document ranking system ranks document data in response to a search request. A processor includes a document ranking application. The document ranking application includes modules executable by the processor to rank documents retrieved from the data source in response to a search request. A term frequency module queries the data source to identify a plurality of documents that each includes a key term. The key term matches a search term in the search request. The term frequency module also determines a corresponding term frequency value for the key term in each of the plurality of documents. The term frequency corresponds to a total number of occurrences of the key term in a particular document. A negation module retrieves negation terms from a memory and compares the negation terms to other terms included in each document that are within a selected proximity of each occurrence of the key term. The negation module also excludes a particular occurrence of the key term in each document if at least one of the negation terms matches the other terms within the selected proximity of the particular occurrence of the key term. The negation module also determines a corresponding term weight value for the key term in each document based on each occurrence of the key term that has not been excluded. A ranking module determines a corresponding relevancy ranking value for each document based on the corresponding term frequency value and corresponding term weight value. A user interface module generates a list of document data for display. The list identifies the one or more documents in order based on the corresponding relevancy ranking value of each document.

According to another aspect, a ranking system is provided. The ranking system includes a memory that includes at least one negation term. The ranking system includes a document ranking application with modules that are executable by a processor to process a plurality of documents retrieved from a data source. The document ranking application includes a token generation module to generate a corresponding token for each word in document data included in at least one of the plurality of documents. The document ranking application also includes a tagging module to retrieve the at least one negation term and at least one negation rule from the memory. The tagging module also compares the at least one negation term according to the at least one negation rule to other terms in the document data that are within a selected proximity of each word. The tagging module also assigns a negative tag to the corresponding token for a particular word if the at least one negation term matches any other terms within the selected proximity of the particular word according to the negation rule. Alternately, the tagging module assigns a positive tag to the corresponding token if the at least one negation term does not match any of the other terms within the selected proximity of the particular word according to the negation rule. The tagging module also stores processed document data for the at least one document in a data store. The processed document data includes document content, tokens, and the tags assigned to each of the tokens.

The ranking system also includes a document data display application with modules executable by the processor to generate processed document data for display in response to a search request. The document data display application includes a token analysis module to receive the search request including document identification data. The token analysis module also identifies the processed document data in the data store that corresponds to the document identification data. The token analysis module also searches the processed document data to identify tokens that have been assigned the positive context tag. The document data display application also includes a display module to generate the processed document data for display that includes visual indicators for each word having a corresponding token that is assigned the positive context tag.

According to another aspect, a ranking system is provided. The ranking system includes a memory that includes at least one negation term. The ranking system includes a document ranking application with modules that are executable by a processor to process a plurality of documents retrieved from a data source. The document ranking application includes a token generation module to generate a corresponding token for each word in document data included in at least one of the plurality of documents. The document ranking application also includes a tagging module to retrieve the at least one negation term from the memory and compare the at least one negation term to other terms included in the document data that are within a selected proximity of a particular word. The tagging module also assigns a negative tag to the corresponding token for the particular word if the at least one negation term matches any other terms within the selected proximity of the particular word. Alternately, the tagging module assign a positive tag to the corresponding token for the particular word if the at least one negation term does not match any of the other terms within the selected proximity of the particular word. The tagging module also stores processed document data for the at least one document in a data store. The processed document data includes document content, tokens, and the tags assigned to each of the tokens.

The ranking system also includes a document data display application that includes modules that are executable by the processor to display document data retrieved from the data store in response to a search request. The document data display application includes a token analysis module to receive the search request comprising document identification data. The token analysis module also identifies processed document data in the data store that corresponds to the document identification data and searches the processed document data for tokens that have been assigned the positive context tag. The document data display application also includes a display module that generates the processed document data for display with visual indicators for each word where the corresponding token is assigned the positive context tag.

The ranking system also includes an analytics application that includes modules that are executable by the processor to analyze the processed document data retrieved from the data store in response to another search request. The analytics application includes an analytics module that receives the other search request comprising at least one of the document identification data and document preparer identification data. The analytics module also identifies predictive document data and corresponding result documents data from the processed document data in the data store that correspond to the at least one of the document identification data and the document preparer identification data. The analytics module also identifies tokens in the predictive document data and the corresponding result document data that correspond to the same word and identify the tags assigned to each of the identified tokens. The analytics module also assign an accuracy rating to the predictive document data based on the tags assigned to each of the identified tokens. The accuracy rating has a first value when each of the identified tokens are both assigned the positive context tag and has a second value when one of the identified tokens is assigned the positive context tag and the other identified token is assigned the negative context tag. The analytics module also stores the accuracy rating for the particular predictive document in the memory.

BRIEF DESCRIPTION OF THE DRAWINGS

FIG. 3 is a screen shot of a display generated by document ranking application according to one aspect of a document ranking system.

DETAILED DESCRIPTION

Aspects of the ranking system described herein enable searching and ranking electronic documents, including records, images, other documents, and/or other data, stored in a data source, such as a database, a server, or other computer system. The ranking system uses a contextual analysis to determine whether a term is used in a positive context or a negative context or whether the term is used in a negative context in conjunction with a positive context. A context is identified via one or more negating prefix terms and one or more suffix negating terms. A term is in a negative context if it is within a selected proximity of a negating prefix term or phrase or within a selected proximity of a negating suffix term. A term is in a positive context if it is not within a selected proximity of a negating prefix term or phrase and not within a selected proximity of a negating suffix term. A term includes one or more words, including a phrase.

According to one aspect, the ranking system employs a ranking application that uses one or more selected prefix term negation rules and/or one or more selected suffix term negation rules to determine whether the occurrence of a search term in a particular document, including a record, or alternately in a particular sentence of a document should be excluded when determining a relevancy ranking of that particular document, including a record. The ranking system also may be applied to other data, including images with associated text or data, hyper text markup language (HTML) pages, other web pages, and other data.

Figure 1A:
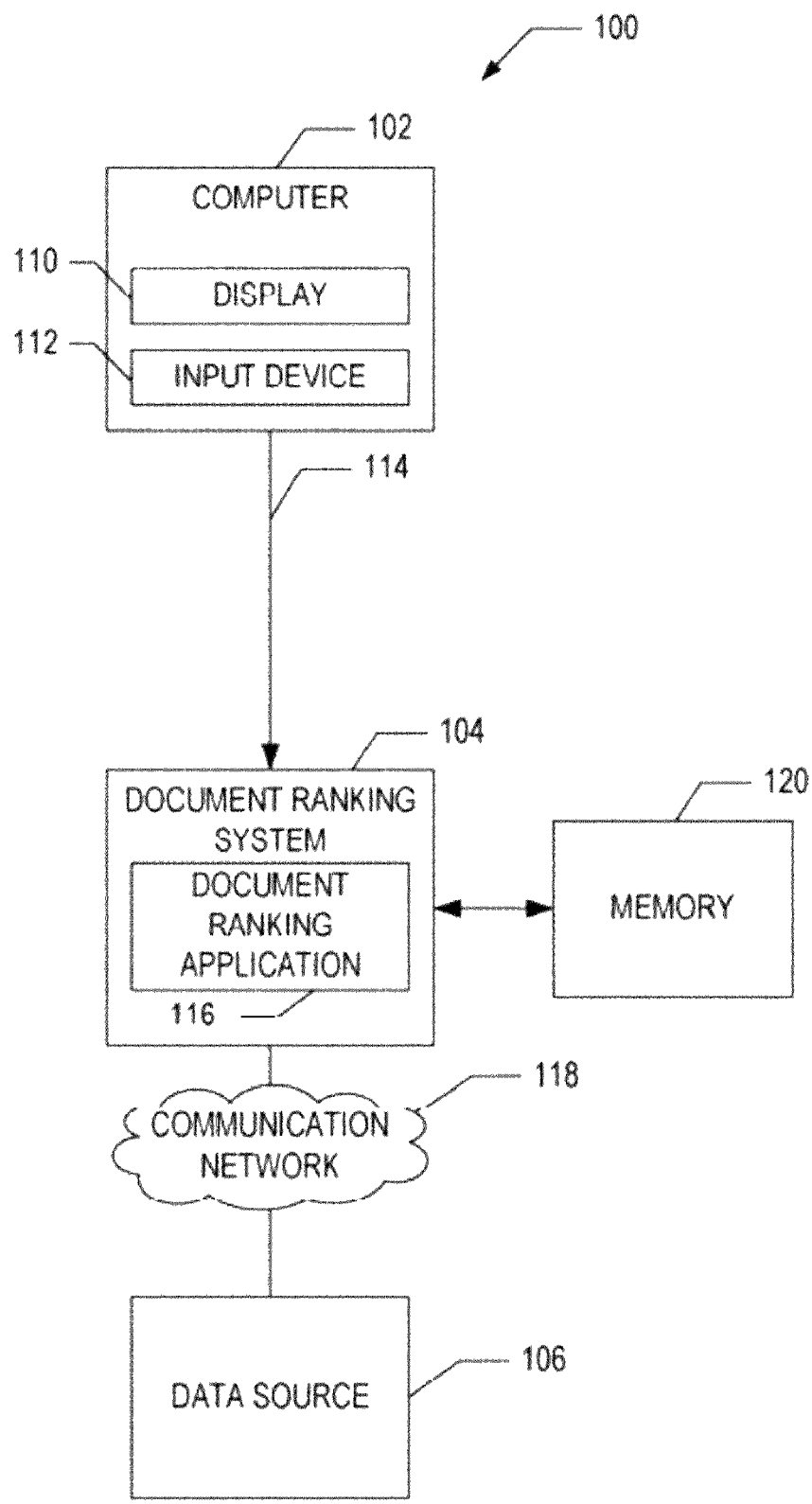
FIGS. 1A and 1B are a block diagrams of a computing environment for implementing a document ranking system according aspects of the invention.

FIG. 1A is a block diagram of an exemplary computing environment 100 for managing the retrieval and ranking of documents from a data source according to an aspect of the present invention. The computing environment 100 includes at least one computer 102, a document ranking system (DRS) 104, and a data source 106.

According to one aspect, the computer 102 is a computing or processing device, such as a personal computer, a server computer, or a mobile processing device. The computer 102 includes one or more processors that process software or other machine-readable instructions and memory to store the software or other machine-readable instructions and data. The memory may include volatile and/or non-volatile memory. The computer 102 also includes a communication system to communicate via wireline and/or wireless communications, such as through the Internet, an intranet, an Ethernet network, a wireline network, a wireless network, and/or another communication network. The computer 102 may include a display 110, such as a computer monitor, for viewing data, and an input device 112, such as a keyboard or a pointing device (e.g., a mouse, trackball, pen, touch pad, or other device), for entering data. The computer 102 can be used by a user to request data from the data source 106, including healthcare data and medical data, records, images, and/or other documents. In one example, the user is from a business enterprise, such as a healthcare enterprise.

Figure 1B:
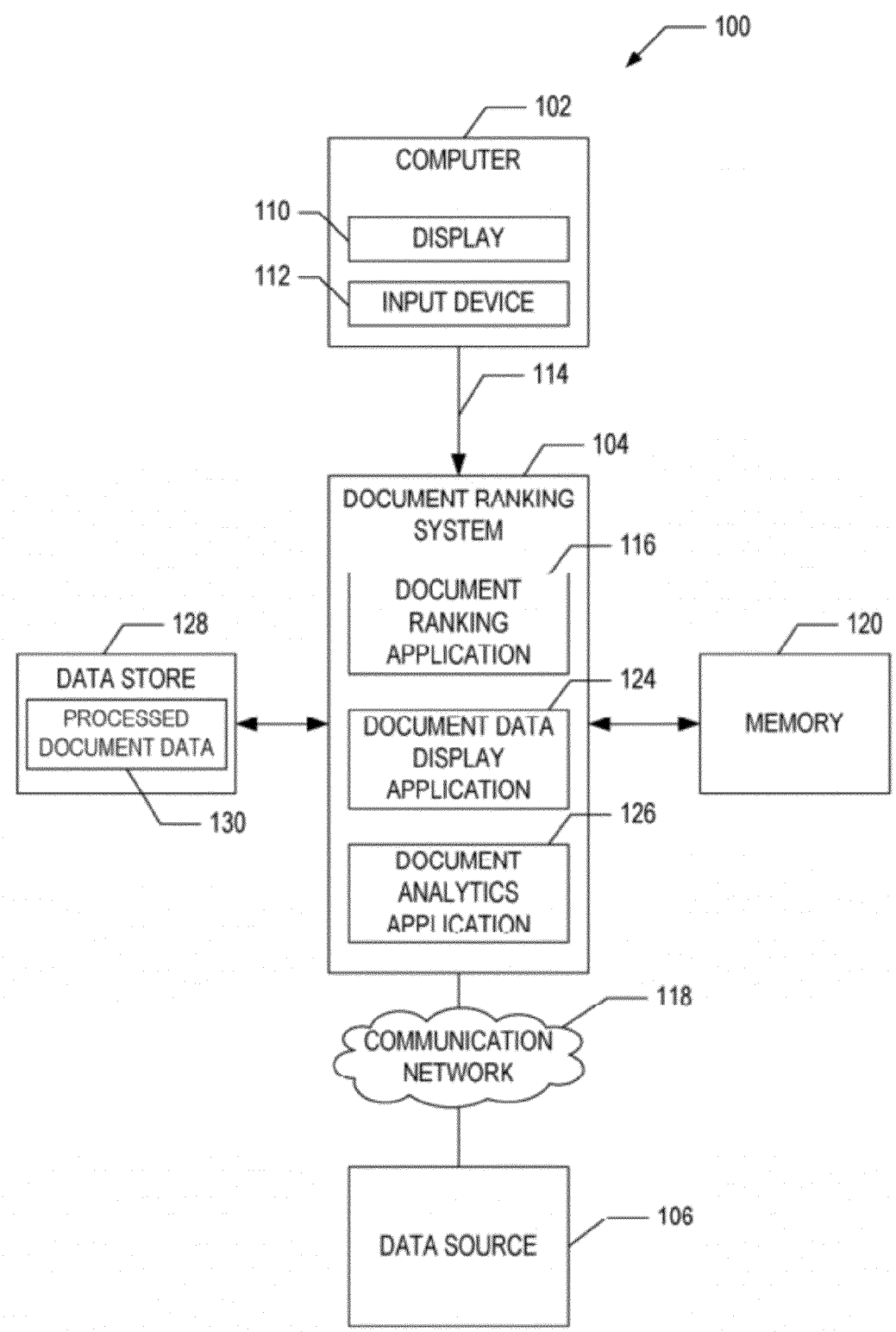

According to one aspect, users use the computer 102 to generate a search request, as indicated by 114, to search for records, such as medical records of a patient. For example, the user uses the keyboard to interact with a search entry screen of a user interface on the display 110 to enter a search that includes one or more search terms. After entering the search terms, the user uses the input device 112 to select an input control, such as a search control button, displayed on the entry screen to generate the search request 114. Although one computer 102 is depicted in FIGS. 1A and 1B, the computing environment 100 may include one or multiple computers. Moreover, although the computing environment 100 was described above as being used by a healthcare enterprise, the principles and aspects described herein can be applied to other applications in which a relevancy ranking is determined for retrieved documents, including business and non-business applications. For example, the computing environment 100 can be used by a user at an educational institution, such as a University or College, to search for educational related documents. In another example, the computing environment 100 can be used by an individual to search government documents. Other examples exist.

The search request 114, which includes one or more search terms, is transmitted to the DRS 104. The DRS 104 queries the data source 106 to retrieve document data for documents that include terms that match the one or more search terms included in the search request 114. Document data may include document content. Document content includes images, electronic documents, records, and/or other documents and documents with structured and/or unstructured data. Structured data is text associated with a particular field or location of a document, such as a name, a gender, or a date of birth. Unstructured data is free text that is not associated with a particular limited field or location of a document. Document content may include all of the document content or a portion of the document content for a particular document, including a record. Metadata includes document creation and edit dates, user creation and edit dates, a storage location on a network or the data source 106, and/or other information about the document and/or the data source 106. A particular search term found in a document is referred to herein as a key term. A key term (and a search term) may include one or more words, which includes a phrase.

The data source 106 is a computer system, a database, or another data system that stores data, including images, electronic documents, records, other documents, and/or other data. For example, a database associated with a healthcare enterprise can store medical images, electronic documents, medical and health records, and/or other patient data. In one example, the patient data includes examination (exam) data and radiology data for one or more modalities, including computed radiography, computed tomography, radiographic imaging, ultrasound, X-ray, radioflouoscopy, nuclear medicine, and other modality devices. The exam data includes structured data and unstructured data for one or more exams. Other examples exist. The data source 106 may include memory and one or more processors or processing systems to receive, process, and transmit communications and store and retrieve data.

The data source 106 can be a remote or separate data storage system. Alternatively, the data source 106 can be a local computer system. For example, the data source 106 can be a local indexed database that stores document data previously retrieved from a separate data storage system via, for example, a crawler. The crawler is, for example, a crawling application that periodically retrieves and indexes document data from documents stored in one or more data sources and stores the indexed data in another data source in a searchable form. In one example, the other data source is a local indexed database.

The DRS 104 retrieves document data from the data source 106 in response to the search request 114 received from the computer 102. The DRS 104 executes a document ranking application 116 to rank documents stored in the data source 106. For example, the document ranking application 116 determines a relevancy ranking for each document in the data source 106 that includes key terms and then displays retrieved document data for each document, including each record, according to determined relevancy rankings. The DRS 104 displays the retrieved document data for a particular document, including a record, as a search result in a list.

In another aspect, the document data from a document with the greatest relevancy ranking appears at the top of the list, and the document data from a document with the lowest relevancy ranking appears at the bottom of the list. According to one aspect, the relevancy ranking for a particular document in the data source 106 is a numerical value that is determined based on the number of times the key term appears in a positive context in that particular document. The context or meaning of a key term can be determined by analyzing language surrounding the key term.

According to one aspect, the DRS 104 communicates with the data source 106 over a communication network 118, such as the Internet, an intranet, an Ethernet network, a wireline network, a wireless network, and/or another communication network, to identify relevant images, electronic documents, records, other documents, and/or other data to retrieve from the data source 106 in response to the search request 114. In another aspect, the computer 102 communicates with the DRS 104 through the communication network 116. In still another aspect, the DRS 104 communicates with the data source 104 through a direct connection, or the data source 106 is integrated with the DRS.

According to one aspect, a memory 120 stores negation data and/or negation term rules that are used by the document ranking application 116 to determine the context of each occurrence of a key term. The memory 120 can be separate from the DRS 104. Alternatively, the memory 120 may be contained within the DRS 104.

In one embodiment, a prefix negation rule includes that a prefix negation term appear before the key term in the same sentence. In another embodiment, a prefix negation rule includes that a prefix negation term appear before the key term in the same paragraph. In another embodiment, a prefix negation rule includes that a prefix negation term appear before the key term. One or more prefix negation rules may be used, and one or more prefix negation terms may be used with the one or more prefix negation rules. A prefix negation term may include one or more words, which includes a phrase.

In one embodiment, a suffix negation rule includes that a suffix negation term appear after the key term in the same sentence without a negating prefix. In another embodiment, a suffix negation rule includes that the suffix negation term appear after the key term in the same sentence. In another embodiment, a suffix negation rule includes that the suffix negation term appear after the key term in the same paragraph. In another embodiment, a suffix negation rule includes that the suffix negation term appear after the key term. One or more suffix negation rules may be used, and one or more suffix negation terms may be used with the one or more suffix negation rules. A suffix negation term may include one or more words, which includes a phrase.

In one embodiment, the DRS 104 is integrated with a PACS. In another embodiment, the DRS 104 is integrated with a data storage system 106 having PACS documents, including radiology exams and radiology images.

Documents may use terms in both positive and negative context. For example, when a radiologist performs a chest x-ray, the radiologist will examine the x-ray to determine if certain conditions are present and will state a positive or a negative diagnosis on an examination report or other medical documents whether the patient has a particular medical condition, such as pnucmothorax, a pleural effusion, or other chest condition.

According to another aspect, as shown in FIG. 1B, the DRS 104 includes a document data display application 124. The DRS 104 executes the document data display application 124 to generate document data for one or more documents with visual indicators to display on the computer 102. In particular, as explained in more detail below, the document data display application 124 uses negation data and/or negation term rules retrieved from the memory to generate document data for display that includes visual indicators for words that in the one or more documents that are used in a positive context. Visual indicators correspond to displayable attributes that are used to distinguish words that are used in a positive context from surrounding words or other words in the document that are not used in a positive context. Visual indicators used to distinguish words include, for example, a different font, a different size, a different color, a different format, or any other distinguishing visual indicator. Although the document data display application 124 is described herein in connection with displaying documents associated with patients and/or healthcare providers, it is contemplated that the document data display application 124 could be used to display other types of documents that have been processed by the DRA 116.

According to another aspect, the DRS 104 includes a document analytics application 126. The DRS 104 executes the document analytics application 126 to generate analytic data that relates to, for example, accuracy, and/or efficiency of a prediction or a determination specified in a predictive document. The document analytics application 126 generates analytic data by identifying the same terms in a predictive document and a result document and determining whether or not those same terms are used in a positive context in both the predictive and the result documents. Predictive documents include, for example, reports that include a prognosis for whether or not a patient has a particular medical condition. Result documents include, for example, reports that include a diagnosis for whether or not a patient has the particular medical condition. Each predictive document is associated with a corresponding result document.

As an example, after a radiologist performs an X-ray on the chest of a patient, the radiologist may issue a report with a prognosis that a portion of lung tissue shown in the X-ray is indicative of a cancerous tumor and recommend that a biopsy be performed on the suspected tissue. Subsequently, a pathologist may issue a corresponding report with a diagnosis that confirms whether or not tissue identified on the X-ray is cancer. The document analytics application 224 compares terms in the radiologist's report with the terms in the pathologist's report to determine whether the terms (e.g., cancer) are used in the same context in both reports. If the terms appear in a positive context in both reports, the radiologist's prognosis is deemed accurate. Alternately, if terms appear in a positive context in the radiologist's report but appear in a negative context in the pathologist's report, the radiologist's prognosis is deemed inaccurate. By tracking the accuracy of the prognoses of a particular radiologist in this manner overtime, analytics can be generated for that particular radiologist that indicates, for example, a percentage of accurate prognoses issued by that radiologist.

Figure 2:
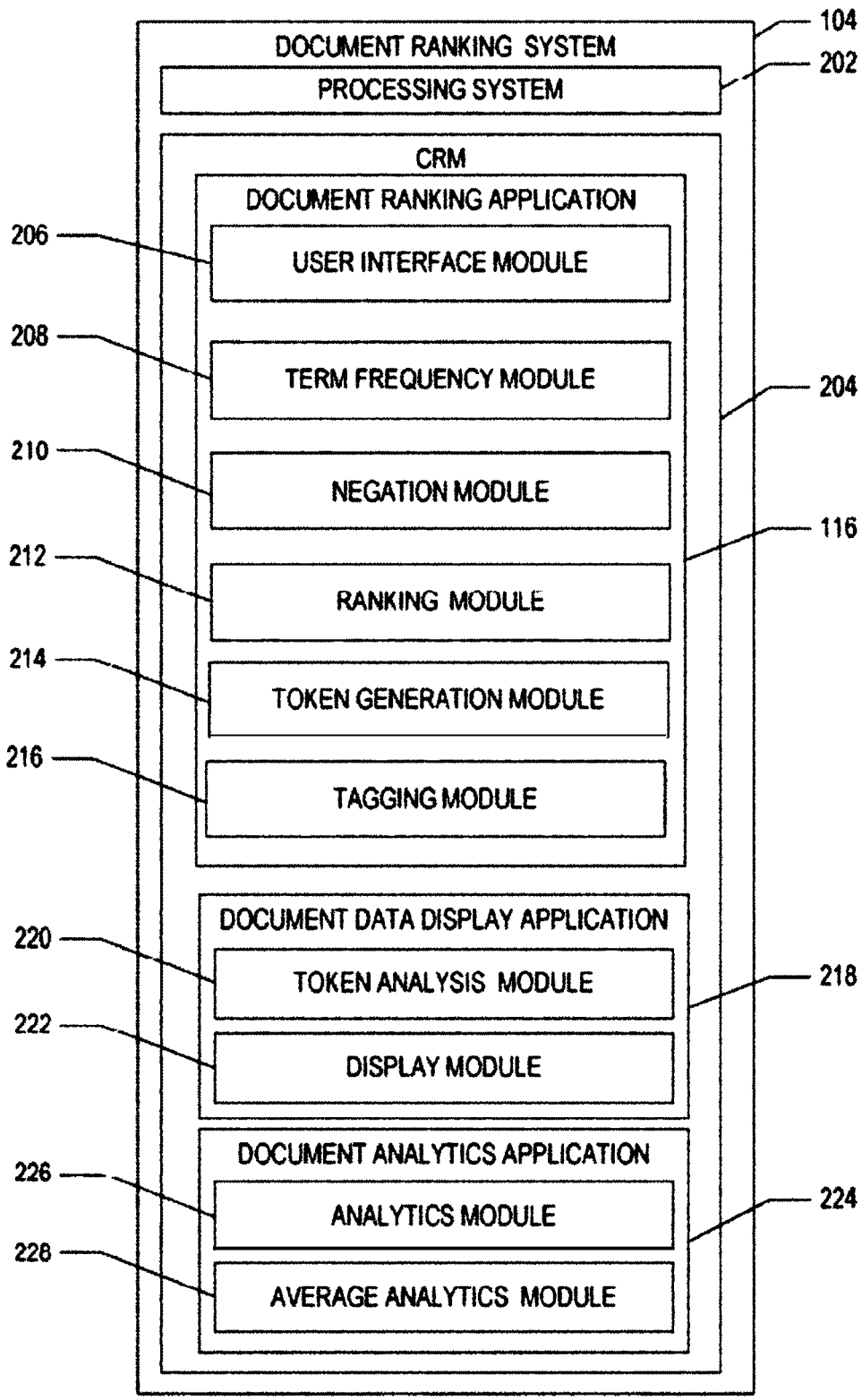
FIG. 2 is a block diagram of a document ranking application according to one aspect of a document ranking system.

FIG. 2 is a block diagram that depicts an exemplary DRS 104. According to one aspect, the DRS 104 includes a processing system 202 that executes a document ranking application 116 to determine the relevancy ranking of retrieved documents. The processing system 202 includes memory and one or more processors, and the processing system 202 can reside on a computer or other processing system.

The DRA 116 includes instructions or modules that are executable by the processing system 202 to manage the retrieval of documents, including a record, from the data source 106. The DRS 104 includes a computer readable media 204 configured with the DRA 116.

Computer readable media (CRM) 204 may include volatile media, nonvolatile media, removable media, non-removable media and/or another available medium that can be accessed by the DRS 104. By way of example and not limitation, computer readable media 204 comprises computer storage media and communication media. Computer storage media includes memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

A user interface module 206 generates data for display and receives data entered by a user. The user interface module 206 receives a search request 114 from the computer 102 and provides search results to the computer 102. For example, the search results are displayed on the display 110 associated with the computer 102. The search results include, for example, document data from each document, including each record, in the data source 106 that includes the key term. As described above, the order in which the document data for each document appears in the displayed list of results is based on a corresponding relevancy ranking determined for each document.

A term frequency module 208 identifies key terms in documents or document data being searched. The term frequency module 208 also determines the total number of occurrences that a particular key term appears in a particular document. The total number of occurrences is referred to herein as the term frequency (TF). In one example, the search request 114 includes the search term "pnuemothorax," and the term frequency module 208 identifies eight (8) occurrences of the key term "pnuemothorax" in a particular document. In this example, the TF for "pnuemothorax" in this particular document is 8.

A negation module 210 retrieves negation data from the memory 120. The retrieved negation data includes one or more prefix negation terms and/or one or more suffix negation terms that indicate a negative context of a term. The negation module 210 then compares the retrieved negation data to terms within a selected proximity of an identified key term included in a particular document to determine if the term has a negative context. The selected proximity may be a selected number of words immediately preceding and/or immediately following the occurrence of the key term in a document. For example, the selected proximity may include a term that is within two words immediately preceding an occurrence of the key term and/or a term that is within two words immediately following the occurrence of the key term. In another example, the selected proximity may be a selected number of words immediately preceding and/or immediately following the occurrence of the key term in a same sentence. In another example, the selected proximity may be a selected number of words immediately preceding and/or immediately following the occurrence of the key term in a same paragraph. Other examples exist.

In one example, the selected proximity is predefined and not user selected. In another example, the selected proximity is user selected.

In another example, a user can select different proximities for different searches. If any one of the retrieved negation terms matches a term within the selected proximity of the key term, that key term is in a negative context and is negated or excluded from determining a relevancy ranking for the particular document. If the retrieved negation terms do not match any terms within the selected proximity of the key term, that key term is in a positive context and is included in determining the relevancy ranking for that particular document. In one embodiment, the negation terms include prefix negation terms and/or suffix negation terms. As explained in more detail below, determining the relevancy ranking for a particular document includes determining a relevancy ranking value for that particular document in one example.

As one example, Table 1 shows an exemplary list of prefix negation terms stored in the memory 120 that are used to negate key terms in ranking a particular document. In this example, if any of the prefix negation terms shown in Table 1 appear before the key term within the selected proximity, then that key term is negated or excluded from determining the relevancy ranking value of the particular document. Other or additional prefix negation terms may be used, and fewer than the prefix negation terms shown in Table 1 may be used.

TABLE 1

| Prefix Negation Terms |
| --- |
| No |
| Without |
| History |
| Resolution |
| Rule Out |
| Not See |
| Evaluate |
| Risks |
| Risk |
| Resolved |

As another example, Table 2 shows an exemplary list of suffix negation terms stored in the memory 120 that are used to negate key terms in ranking the document. If any of the suffix negation terms shown in Table 2 appear after the key term within the selected proximity, then that key term is negated or excluded from determining the relevancy ranking value of the document. Other or additional suffix negation terms may be used, and fewer than the suffix negation terms shown in Table 2 may be used.

TABLE 2

| Suffix Negation Terms |
| --- |
| Resolved |
| Not Demonstrated |
| Not Seen |
| Not Evident |
| Not Visualized |
| Not Confirmed |
| Not Noted |
| Not Identified |
| Not Present |
| Not Appreciated |
| Not Apparent |
| Not Detected |

According to one aspect, the negation module 210 determines a number of negated occurrences for the key term in each document. The number of negated occurrences corresponds to a total of the key term occurrences in a document where the retrieved prefix negation terms and/or suffix negation terms match other terms within the selected proximity of the key term.

The negation module 210 calculates a term weight (TW) value for the key term. The TW is the total number of times that the key term appears in a positive context within the particular document. An instance of a key term is in a positive context when it is not negated by one or more negation terms under one or more negation rules. A key term is in a negative context when it is negated by one or more negation terms under one or more negation rules. If the key term is not negated based on the negation data, it is a positive result. If the key term is negated based on the negation data, it is a negative result. For the purposes of identifying false positives and false negatives in one aspect, a document with a term weight of zero is considered a negative result, and a non-zero term weight is considered a positive result.

According to one aspect, the TW value is determined based on the difference between the term frequency (TF) and the number of negated occurrences. For instance, in the example above, the term frequency module 208 identified eight (8) occurrences of "pnuemothorax" in a document in response to a search request 114 that included the search term "pnuemothorax." If there are two occurrences of the key term "pnuemothorax" within a selected proximity of a retrieved negation term, the negation module 210 determines the number of negated occurrences is equal to two (2). In this example, the TW value for "pnuemothorax" is calculated by subtracting the two (2) negated occurrences from the eight (8) total occurrences, which indicates that there are six (6) occurrences of the term "pnuemothorax" in a positive context.

A ranking module 212 determines a relevancy ranking value of a particular document based on the calculated TF and TW values. In one aspect, the ranking module 212 determines the relevancy ranking value for a document by determining a document relevance (DR) value based on a ratio that includes the TW value in a numerator of the ratio and the TF value in the denominator of the ratio. According to one aspect, the DR value is calculated as follows.

$$DR = \frac{TW^3}{TF} + 1 \quad \text{(Eq. 1)}$$

The user interface module 206 generates a display of a list of search results that includes document data for each document that included the key term. The document data for each document is arranged in the list according to the DR value of that document. In one example, the list of document data is arranged in descending order according to the DR values of the documents. In another example, if DR values for a particular group of documents are equal, the document data for that particular group of documents is arranged in descending order according to their corresponding TW values. In another example, if the DR and TW values for another group of documents are equal, the other group of documents is arranged in descending order according to their corresponding TF values. Table 3 shows an example of ranking results for documents based on calculated TW, TF, and DR values.

TABLE 3

| Displayed Record List | TW | TF | DR |
|---|---|---|---|
| Record 1 | 7 | 8 | 43.88 |
| Record 2 | 6 | 7 | 31.86 |
| Record 3 | 5 | 5 | 26.00 |
| Record 4 | 4 | 4 | 17.00 |
| Record 5 | 4 | 5 | 13.80 |
| Record 6 | 3 | 3 | 10.00 |
| Record 7 | 3 | 4 | 7.75 |
| Record 8 | 3 | 5 | 6.4 |
| Record 9 | 2 | 2 | 5.00 |
| Record 10 | 2 | 3 | 3.67 |
| Record 11 | 2 | 4 | 3.00 |
| Record 12 | 2 | 5 | 2.60 |
| Record 13 | 1 | 1 | 2.00 |
| Record 14 | 1 | 2 | 1.50 |
| Record 15 | 1 | 3 | 1.33 |
| Record 16 | 1 | 4 | 1.25 |
| Record 17 | 0 | 4 | 1.00 |
| Record 18 | 0 | 3 | 1.00 |
| Record 19 | 0 | 2 | 1.00 |
| Record 20 | 0 | 1 | 1.00 |

In one aspect, positive results are placed higher on the list than negative results. In this aspect, a positive result refers to a document having a non-zero term weight. A negative result refers to a document having a term weight of zero.

According to another aspect, a token generation module 214 is executed by the processing system 202 to tokenize the text of the documents and generate tokens. Tokenizing or tokenization is the process of parsing a stream of text included in retrieved document data into meaningful elements. The token generated by the token generation module 214 can be a word, a string, a number, a series of numbers, or other token. According to one aspect, the token generation module 214 generates a token for each word in a document.

According to another aspect, the token generation module 214 generates a token for specific terms or words included in the document data included in the documents received from the data source 106. In one such aspect, the token generation module 214 retrieves a list of predefined terms from the memory 120 and only generates tokens for words in the document data that match terms in the list of predefined terms. As one example, the list of predefined terms includes terms that correspond to medical and/or other terms commonly used in reports generated by healthcare providers.

A tagging module 216 is executed by the processing system 202 to assign a tag to each token to indicate whether a corresponding word is used in a positive or negative context. Tags refer to, for example, part-of-speech tags, wherein each token corresponding to a word in a sentence is assigned a tag that describes the sense in which the word is used in that sentence (i.e., the part-of-speech of the word). Example tags include noun, proper noun, verb, past tense verb, positive context, negative context, etc.

According to one aspect, the tagging module 216 determines the tag for a particular token according to contextual analysis rules. For example, the tagging module 216 is also configured to retrieve negation data from the memory 120. As described above, the retrieved negation data includes one or more prefix negation terms and/or one or more suffix negation terms that indicate whether a particular term or word is used in a negative context. The tagging module 216 compares the retrieved negation data to terms within a selected proximity of a particular word included in the document data to determine if that particular word has a negative context.

The tagging module 216 assigns a "positive context" tag to a token that corresponds to the particular word when that particular word is not within a selected proximity of the retrieved negation terms. Alternately, the tagging module 216 assigns a "negative context" tag to the particular token when the corresponding word is within the selected proximity of a retrieved negation term. Although the tag is described herein as a string value such as "positive context" or "negative context", it is contemplated that the tag can be a numerical value that indicates a positive context or negative context. For example, a tag "1" is assigned to tokens that correspond to words that are used in a positive context. As another example, a tag "0" is assigned to tokens that correspond to words that are used in a negative context.

According to one aspect, the tagging module 216 stores processed or searched document data 130 in the data store 128, such as shown in FIG. 1B. The processed document data includes document content, tokens, and the corresponding tags assigned to tokens for document data previously retrieved from the data source 106. The data store 128 is, for example, a computer system, a database, or another data system.

According to another aspect, the tokens stored in the data store 128 by the tagging module 216 only include tokens that have been assigned a "positive context" tag. In this aspect, the tagging module 216 discards or ignores tokens that have been assigned a "negative context" tag.

According to another aspect, the processing system 202 executes the document data display application 124 to display document data on the display 110. More specifically, the document data display application 218 includes instructions or modules that are executable by the processing system 202 to manage the retrieval of processed document data 130 from the data store 128 and to display the processed document data 130 with visual indicators for words or terms that are used in a positive context. As explained above, visual indicators correspond to displayable attributes that are used to distinguish words that are used in a positive context from surrounding words or other words in the document that are not used in a positive context.

According to one aspect, the document data display application 218 is used by a user of the DRS 104 to display processed document data for a particular patient. For example, the document data display application 218 analyzes tags assigned to tokens in the processed document data 130 stored in the data store 128 for the particular patient to determine whether the particular token corresponds to a word that is used in a positive context or negative context. The document data display application 218 then displays words that are used in a positive context with a visual indicator. Thus, the document data display application 218 enables user to ready detect, find, or see terms in documents that are used in a positive context by associating visual indicators with such terms.

As explained above in reference to FIG. 1A, users can use the computer 102 to generate a search request 114. In one aspect, the user uses the keyboard to interact with a search entry screen of a user interface on the display 110 to enter a search that includes patient document identification data, such as a name, social security number, or other document identification data for a particular patient. After entering the patient document identification data, the user uses the input device 112 to select an input control, such as a search control button, displayed on the entry screen to generate the search request 114 to search the data store 128.

A token analysis module 220 receives the search request 114 that includes patient document identification data from the computer 102. The token analysis module 220 identifies processed document data 130 in the data store 128 that correspond to a particular patient based on the patient document identification data. The token analysis module 220 then searches the identified processed document data for tokens that correspond to words that are used in a positive context. For example, the token analysis module 220 searches for tokens that have a "positive context" tag.

A display module 222 generates data for a particular document to display on the computer 102 for the particular patient. The display module 222 then provides processed document data to the user interface module 206 that includes visual indicators for words that correspond to tokens that have a "positive context" tag. The user interface module 206 generates a display on the display 110 that includes the processed document data with the visual indicators. According to one aspect, the visual indicators are term clouds.

Figure 3:
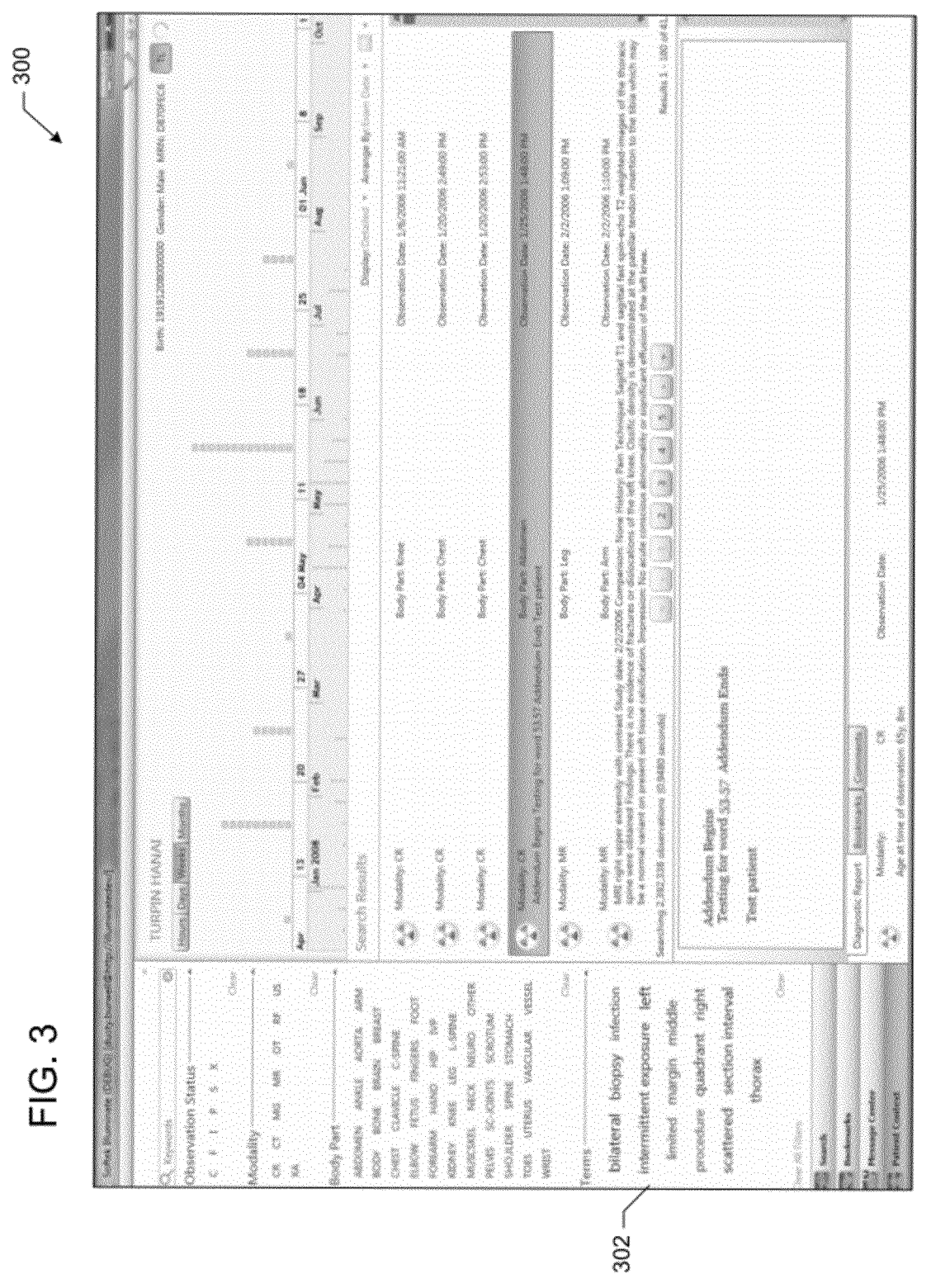

FIG. 3 is a screen shot 300 of document data generated for display for a particular patient. The screen shot 300 includes a section labeled Terms, as indicated by 302, which includes term clouds. As can be seen, some of the terms in the term cloud appear larger than other terms and, thus, are readily identifiable by a viewer of the display 110 associated with the computer 102. For example the term "bilateral" appears larger than surrounding terms. In this example, bilateral is used in connection with biopsy infection and, thus, is used in a positive context.

Referring back to FIG. 2, in another aspect, the document data display application 218 sends data to an output device (not shown) to generate physical or tangible documents that include visual indicators for terms that are used in a positive context.

According to another aspect, the processing system 202 executes a document analytics application 224 to generate analytic data that relates to, for example, accuracy, and/or efficiency of prognoses made by healthcare providers. The document analytics application 224 generates analytic data by identifying the same terms in a predictive document and a result document and determining whether or not those same terms are used in a positive context in both the predictive and the result documents. As described above, predictive documents include, for example, reports that include a prognosis for whether or not a patient has a particular medical condition. Result documents include, for example, reports that include a diagnosis for whether or not a patient has the particular medical condition. Each predictive document is associated with a corresponding result document.

An analytics module 226 receives a search request 114 that includes patient identification data and/or healthcare provider identification data from the computer 102. The healthcare provider identification data includes, for example, a name, social security number, personal identification number (PIN), or other document preparer identification data for a particular document. The analytics module 226 identifies one or more predictive documents and one or more corresponding result documents in the data store 128 that correspond to a particular patient based on the patient identification data and/or healthcare provider identification information.

The analytics module 226 then searches the predictive documents and corresponding result documents for tokens that correspond to the same word and their assigned tags to generate analytic data. For example, if the analytics module 226 identifies the same term in a particular predictive document and a corresponding result documents and that same term (e.g., cancer) corresponds to tokens that have a "positive context" tag in both the predictive and result documents, an accuracy rating of 1 is assigned to the healthcare provider for that particular predictive document. Alternately, if the same term (e.g., cancer) corresponds to a token that has a "positive context" tag in the particular predictive document but corresponds to a token that has a "negative context" tag in the result document, an accuracy rating of 0 is assigned to the healthcare provider for that particular predictive document. In other embodiments, the accuracy rating may include a string value, a fraction, a percentage, or other rating.

According to another aspect, the analytics module 226 stores the accuracy analytics ratings assigned to the healthcare provider for the particular predictive document in the memory 120.

An average analytics module 228 calculates an average accuracy percentage over time for a particular healthcare provider by retrieving accuracy ratings assigned to the particular healthcare provider from the memory 120. For example, the average analytics module 228 receives input from a user of the computer 102 that specifies the particular healthcare provider. According to one aspect, the average analytics module 228 generates the average accuracy percentage based on all of the accuracy ratings stored the memory 120 for the particular healthcare provider. For example, if there are ten (10) accuracy ratings stored in the memory 120 for the particular healthcare provider and the accuracy ratings include seven (7) "1"s and three (3) "0", the average analytics module 228 calculates an average accuracy percentage equal to 70 percent.

According to another aspect, the average analytics module 228 receives input from a user of the computer 102 that specifies the particular healthcare provider and a date or date range for determining an average accuracy percentage. The average analytics module 228 searches the memory 120 for accuracy ratings associated with predictive documents that were generated during the specified date or date range. Thereafter, the average analytics module 228 calculates an average accuracy percentage based on the accuracy ratings stored in the memory 120 for the particular healthcare provider for predictive documents that were generated during the specified date or date range.

According to another aspect, analytics module 226 provides accuracy ratings to the user interface module 206 and the average analytics module 228 provides the calculated average accuracy percentages to the user interface module 206. The user interface module 206 generates a display on the display 110 that includes the accuracy ratings and/or average accuracy percentages the particular healthcare provider.

Those skilled in the art will appreciate that variations from the specific embodiments disclosed above are contemplated by the invention. The invention should not be restricted to the above embodiments, but should be measured by the following claims.

What is claimed is:

1. A ranking system comprising:
   a memory comprising at least one negation term;
   a processor comprising:
      a document ranking application comprising modules executable by the processor to process a plurality of documents retrieved from a data source, the document ranking application comprising:
         a token generation module to generate a corresponding token for each word in document data included in at least one of the plurality of documents; and
         a tagging module to:
            retrieve the at least one negation term and at least one negation rule from the memory;
            compare the at least one negation term according to the at least one negation rule to other terms in the document data that are within a selected proximity of each word;
            assign a negative tag to the corresponding token for a particular word if the at least one negation term matches any other terms within the selected proximity of the particular word according to the negation rule;
            assign a positive tag to the corresponding token for the particular word if the at least one negation term does not match any of the other terms within the selected proximity of the particular word according to the negation rule; and
            store processed document data for the at least one document in a data store, the processed document data comprising document content, tokens, and the tags assigned to each of the tokens;
      a document data display application comprising modules executable by the processor to generate processed document data for display in response to a search request, the document data display application comprising:
         a token analysis module to:
            receive the search request including document identification data;
            identify the processed document data in the data store that corresponds to the document identification data; and
            search the processed document data for tokens that have been assigned the positive context tag; and
         a display module to generate the processed document data for display that includes visual indicators for each word where the corresponding token is assigned the positive context tag.

2. The system claim 1 wherein the token comprises at least one member selected from a group consisting of a word, a string, a number, and a series of numbers.

3. The system claim 1 wherein the selected proximity comprises a first selected number of words immediately preceding the particular word and a second selected number of words immediately following the particular word.

4. The system of claim 1 wherein the at least one negation term comprises at least one prefix negation term and at least one suffix negation term.

5. The system of claim 1 wherein the at least one negation rule comprises a prefix negation rule comprising that a prefix negation term appear before the particular word in a same sentence as the particular word within the selected proximity.

6. The system of claim 5 wherein the at least one negation rule comprises a suffix negation rule comprising that a suffix negation term appear after the particular word in the same sentence without the prefix negation term within the selected proximity.

7. The system of claim 1 wherein the document ranking application further comprises a user interface module to:
   receive the processed document data from the display module; and
   display the processed document data comprising the visual indicators at a display.

8. The system of claim 1 wherein the visual indicators comprises term clouds.

9. A ranking system comprising:
   a memory comprising at least one negation term;
   a processor comprising:
      a document ranking application comprising modules executable by the processor to process a plurality of documents retrieved from a data source, the document ranking application comprising:
         a token generation module to generate a corresponding token for each word in document data included in at least one of the plurality of documents; and
         a tagging module to:
            retrieve the at least one negation term from the memory;
            compare the at least one negation term to other terms included in the document data for the at least one document that are within a selected proximity of each word;
            assign a negative tag to the corresponding token for a particular word if the at least one negation term matches any other terms within the selected proximity of the particular word;
            assign a positive tag to the corresponding token for the particular word if the at least one negation term does not match any of the other terms within the selected proximity of the particular word; and
            store processed document data for the at least one document in a data store, the processed document data comprising document content, tokens, and the tags assigned to each of the tokens;
      a document data display application comprising modules executable by the processor to display document data retrieved from the data store in response to a search request, the document data display application comprising:
         a token analysis module to:
            receive the search request comprising document identification data;
            identify the processed document data in the data store that corresponds to the document identification data; and
            search the processed document data for tokens assigned the positive context tag; and
         a display module generates the processed document data for display with visual indicators for each word where the corresponding token is assigned the positive context tag; and
      an analytics application comprising modules executable by the processor to analyze the processed document data retrieved from the data store in response to another search request, the analytics application comprising:
an analytics module to:
receive the other search request comprising at least one of the document identification data and document preparer identification data;
identify predictive document data and corresponding result documents data from the processed document data in the data store that correspond to the at least one of the document identification data and the document preparer identification data;
identify corresponding tokens in the predictive document data and the corresponding result document data that correspond to the same particular word and identify the tags assigned to each of the identified corresponding tokens;
assign an accuracy rating to the predictive document data based on the tags assigned to each of the identified corresponding tokens, wherein the accuracy rating has a first value when each of the identified corresponding tokens are both assigned the positive context tag, and wherein the accuracy rating has a second value when one of the identified corresponding tokens is assigned the positive context tag and another one of identified corresponding tokens is assigned the negative context tag; and
store the accuracy rating for the particular predictive document in the memory.

10. The system claim 9 wherein the token comprises at least one member selected from a group consisting of a word, a string, a number, and a series of numbers.

11. The system claim 9 wherein the selected proximity comprises a first selected number of words immediately preceding the particular word and a second selected number of words immediately following the particular word.

12. The system of claim 9 wherein the at least one negation term comprises at least one prefix negation term and at least one suffix negation term.

13. The system of claim 9 wherein the analytics module is further configured to:
identify a document preparer from the document preparer identification data included in the other search request;
assign the first accuracy rating or the second accuracy rating to the document preparer of the predictive document data; and
store the accuracy rating for the document preparer in the memory; and
the document analytics application further comprising an averaging analytics module to:
retrieve a plurality of accuracy ratings from the memory for the document preparer; and
calculate an average accuracy percentage for the document preparer based on the plurality accuracy ratings assigned to the document over a time period.

14. The system of claim 13 wherein the document analytics application is further configured to:
receive input comprising a selected time period from a user; and
calculate the average accuracy percentage for the document preparer based on the plurality accuracy ratings assigned to the document over the selected time period.

15. The system of claim 14 wherein the document ranking application further comprises a user interface module to:
receive the processed document data with visual indicators from the display module; and
display the processed document data with the visual indicators at a display.

16. The system of claim 15 wherein the user interface module is further configured to display at least one of the accuracy rating and the average accuracy percentage for the document preparer at the display.

17. A ranking method comprising:
generating, at least one processor, a corresponding token for each word in document data included in at least one of a plurality of documents;
retrieving, at the at least one processor, at least one negation term and at least one negation rule from a memory;
comparing, at the at least one processor, the at least one negation term according to the at least one negation rule to other terms in the document data that are within a selected proximity of each word;
assigning, at the at least one processor, a negative tag to the corresponding token for a particular word if the at least one negation term matches any other terms within the selected proximity of the particular word according to the negation rule;
assigning, at the at least one processor, a positive tag to the corresponding token for the particular word if the at least one negation term does not match any of the other terms within the selected proximity of the particular word according to the negation rule;
storing processed document data for the at least one document in a data store, the processed document data comprising document content, tokens, and the tags assigned to each of the tokens;
receiving a search request including document identification data;
identifying, at the at least one processor, processed document data in the data store that corresponds to the document identification data;
searching, at the at least one processor, the processed document data for tokens that have been assigned the positive context tag; and
generating the processed document data for display that includes visual indicators for each word where the corresponding token is assigned the positive context tag.

18. The method of claim 17 wherein the corresponding token comprises at least one member selected from a group consisting of a word, a string, a number, and a series of numbers.

19. The method of claim 17 wherein the selected proximity comprises a first selected number of words immediately preceding the particular word and a second selected number of words immediately following the particular word.

20. The method of claim 17 wherein the at least one negation term comprises at least one prefix negation term and at least one suffix negation term.

21. The method of claim 17 wherein the at least one negation rule comprises a prefix negation rule comprising that a prefix negation term appear before the particular word in a same sentence as the particular word within the selected proximity.

22. The method of claim 21 wherein the at least one negation rule comprises a suffix negation rule comprising that a suffix negation term appear after the particular word in the same sentence without the prefix negation term within the selected proximity.

23. The method of claim 17 further comprising:
receiving the processed document data from a display module; and
displaying the processed document data comprising the visual indicators at a display.

24. The system of claim 17 wherein the visual indicators comprises term clouds.

25. A ranking method comprising:
generating, at least one processor, a corresponding token for each word in document data included in at least one of a plurality of documents;
retrieving, at the at least one processor, at least one negation term from a memory;
comparing, at the at least one processor, the at least one negation term to other terms included in the document data for the at least one document that are within a selected proximity of each word;
assigning, at the at least one processor, a negative tag to the corresponding token for a particular word if the at least one negation term matches any other terms within the selected proximity of the particular word;
assigning, at the at least one processor, a positive tag to the corresponding token for the particular word if the at least one negation term does not match any of the other terms within the selected proximity of the particular word;
storing processed document data for the at least one document in a data store, the processed document data comprising document content, tokens, and the tags assigned to each of the tokens;
receiving a search request comprising document identification data;
identifying the processed document data in the data store that corresponds to the document identification data;
searching the processed document data for tokens assigned the positive context tag;
generating the processed document data for display with visual indicators for each word where the corresponding token is assigned the positive context tag;
receiving another search request comprising at least one of the document identification data and document preparer identification data;
identifying predictive document data and corresponding result documents data from the processed document data in the data store that correspond to the at least one of the document identification data and the document preparer identification data;
identifying corresponding tokens in the predictive document data and the corresponding result document data that correspond to the same particular word;
identifying the tags assigned to each of the identified corresponding tokens;
assigning an accuracy rating to the predictive document data based on the tags assigned to each of the identified corresponding tokens, wherein the accuracy rating has a first value when each of the identified corresponding tokens are both assigned the positive context tag, and wherein the accuracy rating has a second value when one of the identified corresponding tokens is assigned the positive context tag and another one of identified corresponding tokens is assigned the negative context tag; and
storing the accuracy rating for the particular predictive document in the memory.

26. The method claim 25 wherein the corresponding token comprises at least one member selected from a group consisting of a word, a string, a number, and a series of numbers.

27. The method claim 25 wherein the selected proximity comprises a first selected number of words immediately preceding the particular word and a second selected number of words immediately following the particular word.

28. The method claim 25 wherein the at least one negation term comprises at least one prefix negation term and at least one suffix negation term.

29. The method claim 25 further comprising:
identifying a document preparer from the document preparer identification data included in the other search request;
assigning the first accuracy rating or the second accuracy rating to the document preparer of the predictive document data; and
storing the accuracy rating for the document preparer in the memory;
retrieving a plurality of accuracy ratings from the memory for the document preparer; and
calculating an average accuracy percentage for the document preparer based on the plurality accuracy ratings assigned to the document over a time period.

30. The method claim 29 further comprising:
receiving input comprising a selected time period from a user; and
calculating the average accuracy percentage for the document preparer based on the plurality accuracy ratings assigned to the document over the selected time period.

31. The method claim 30 further comprising:
receiving the processed document data with visual indicators from a display module; and
displaying the processed document data with the visual indicators at a display.

32. The method claim 31 further comprising displaying at least one of the accuracy rating and the average accuracy percentage for the document preparer at the display.

33. A non-transitory computer-readable medium encoded with instructions executable by at least one processor to:
generate a corresponding token for each word in document data included in at least one of the plurality of documents;
retrieve at least one negation term and at least one negation rule from a memory;
compare the at least one negation term according to the at least one negation rule to other terms in the document data that are within a selected proximity of each word;
assign a negative tag to the corresponding token for a particular word if the at least one negation term matches any other terms within the selected proximity of the particular word according to the negation rule;
assign a positive tag to the corresponding token for the particular word if the at least one negation term does not match any of the other terms within the selected proximity of the particular word according to the negation rule;
store processed document data for the at least one document in a data store, the processed document data comprising document content, tokens, and the tags assigned to each of the tokens;
receive a search request including document identification data;
identify the processed document data in the data store that corresponds to the document identification data;
search the processed document data for tokens that have been assigned the positive context tag; and
generate the processed document data for display that includes visual indicators for each word where the corresponding token is assigned the positive context tag.

34. A non-transitory computer-readable medium encoded with instructions executable by at least one processor to:
- generate a corresponding token for each word in document data included in at least one of a plurality of documents;
- retrieve at least one negation term from a memory;
- compare the at least one negation term to other terms included in the document data for the at least one document that are within a selected proximity of each word;
- assign a negative tag to the corresponding token for a particular word if the at least one negation term matches any other terms within the selected proximity of the particular word;
- assign a positive tag to the corresponding token for the particular word if the at least one negation term does not match any of the other terms within the selected proximity of the particular word;
- store processed document data for the at least one document in a data store, the processed document data comprising document content, tokens, and the tags assigned to each of the tokens;
- receive a search request comprising document identification data;
- identify the processed document data in the data store that corresponds to the document identification data;
- search the processed document data for tokens assigned the positive context tag;
- generate the processed document data for display with visual indicators for each word where the corresponding token is assigned the positive context tag;
- receive another search request comprising at least one of the document identification data and document preparer identification data;
- identify predictive document data and corresponding result documents data from the processed document data in the data store that correspond to the at least one of the document identification data and the document preparer identification data;
- identify corresponding tokens in the predictive document data and the corresponding result document data that correspond to the same particular word and identify the tags assigned to each of the identified corresponding tokens;
- assign an accuracy rating to the predictive document data based on the tags assigned to each of the identified corresponding tokens, wherein the accuracy rating has a first value when each of the identified corresponding tokens are both assigned the positive context tag, and wherein the accuracy rating has a second value when one of the identified corresponding tokens is assigned the positive context tag and another one of identified corresponding tokens is assigned the negative context tag; and
- store the accuracy rating for the particular predictive document in the memory.

* * * * *